United States Patent [19]

Memmler et al.

[11] Patent Number: 5,745,656
[45] Date of Patent: Apr. 28, 1998

[54] METHOD FOR DECODING TRANSMITTED INFORMATION UNITS

[75] Inventors: Bernd Memmler, Rosengarten; Gerhard Schäfer, Weinsberg, both of Germany

[73] Assignee: Temic Telefunken microelectronic GmbH, Heilbronn, Germany

[21] Appl. No.: 667,659

[22] Filed: Jun. 21, 1996

[30] Foreign Application Priority Data

Jun. 22, 1995 [DE] Germany .................. 195 22 621.6

[51] Int. Cl.$^6$ ...................................... G06F 17/00
[52] U.S. Cl. ........................ 395/50; 395/3; 395/61; 395/900
[58] Field of Search ................ 395/3, 61, 900, 395/50, 10, 76, 60; 364/148, 149, 157, 162, 724.19, 724.2, 724, 724.16

[56] References Cited

U.S. PATENT DOCUMENTS

| 4,367,555 | 1/1983 | Namiki et al. | 375/11 |
| 4,799,486 | 1/1989 | DuFault | 128/419 PG |
| 4,810,101 | 3/1989 | Kage et al. | 375/99 |
| 5,173,925 | 12/1992 | Mizoguchi | 375/14 |
| 5,371,695 | 12/1994 | Baraszu | 364/724.19 |

FOREIGN PATENT DOCUMENTS

| 3516810 | 11/1986 | Germany | H04B 1/22 |
| 4021221 | 3/1991 | Germany | H03M 1/34 |
| 4239506 | 5/1994 | Germany | H03M 7/30 |
| 93/16527 | 8/1993 | WIPO | H03H 21/00 |

Primary Examiner—Tariq R. Hafiz
Attorney, Agent, or Firm—Spencer & Frank

[57] ABSTRACT

The invention relates to a method for decoding transmitted information units by comparing a signal section containing an information unit with a number of reference functions. A reference function is assigned to every possible information unit and that type of information unit is considered to be recognized for which the smallest deviation is established between assigned reference function and signal section. In the method according to the invention, the reference functions are modified in accordance with the signal curve in the respective actual signal section. The modifications are appropriately calculated using a fuzzy controller.

11 Claims, 5 Drawing Sheets

| SUBSECTION | SLOPE | LIMIT VALUE | PERIOD | CONTROLLED VARIABLE | NEXT SUBSECTION |
|---|---|---|---|---|---|
| 1 | FIXED | FIXED | FIXED | NONE | 2 |
| 2 | VARIABLE | FIXED | FIXED | START VALUE | 3 |
| 3 | VARIABLE | VARIABLE | FIXED | START VALUE OF 2 | 4 |
| 4 | VARIABLE | VARIABLE | FIXED | START VALUE OF 2 | 1 |

FIG. 3

METHOD FOR DECODING TRANSMITTED INFORMATION UNITS

BACKGROUND OF THE INVENTION

The invention relates to a method for decoding transmitted information units by comparing a signal section containing an information unit with a number of reference functions, where a reference function is assigned to every possible information unit and that type of information unit is considered to be recognized for which the smallest deviation is established between assigned reference function and signal section.

In the transmission of signals through wired or wireless transmission media, signal shape distortion can be caused by disturbances, for example, thereby corrupting the information content. The detection of the information content of signals distorted in this way, that is the decoding of the individual information units, is possible by comparing the received signal or signal section with reference functions. The reference functions can be selected in such a way that all regularly occurring distortions are taken into consideration for a given signal. Disturbances occurring on a random basis in the transmission path or in the receiving devices cannot be registered with fixed rules. In such a case, the known methods are not able to decode the transmitted information units with complete accuracy.

The object of the invention is therefore to describe a method for decoding transmitted information units by a comparison with reference functions and where even severely distorted signals can be decoded.

SUMMARY OF THE INVENTION

The object of the invention, relating to a method for decoding transmitted information units by comparing a signal section containing an information unit with a number of reference functions, where a reference function is assigned to every possible information unit and that type of information unit is considered to be recognized for which the smallest deviation is established between assigned reference function and signal section, is solved by the reference functions being modified according to the signal curve in the relevant signal section.

The advantageous development of the invention is in accordance with the features of the dependent claims.

It is particularly advantageous when the signal section and the reference functions are divided into subsections corresponding to one another and the signal curve in a subsection of the signal section causes changes to occur in one or several subsections of the reference functions.

In one embodiment of the invention a fuzzy control loop is provided that brings about the appropriate changes to the reference functions in accordance with one or several signal values in the respective signal section.

It is advantageous here for the reference functions in the various subsections to be described by straight lines and for the slope of the straight lines to be matched in the various subsections.

The straight lines in the various subsections have upper and lower limits.

These limiting values are modified in accordance with the signal curve.

By dynamically adapting the reference functions with the help of additional data established from the active transmission, the reliability of error-free decoding of the information units can be increased.

BRIEF DESCRIPTION OF THE DRAWINGS

FIG. 3 table for sequence control from one subsection to the next in forming the reference functions;

DESCRIPTION OF THE PREFERRED EMBODIMENTS

Figure 1:
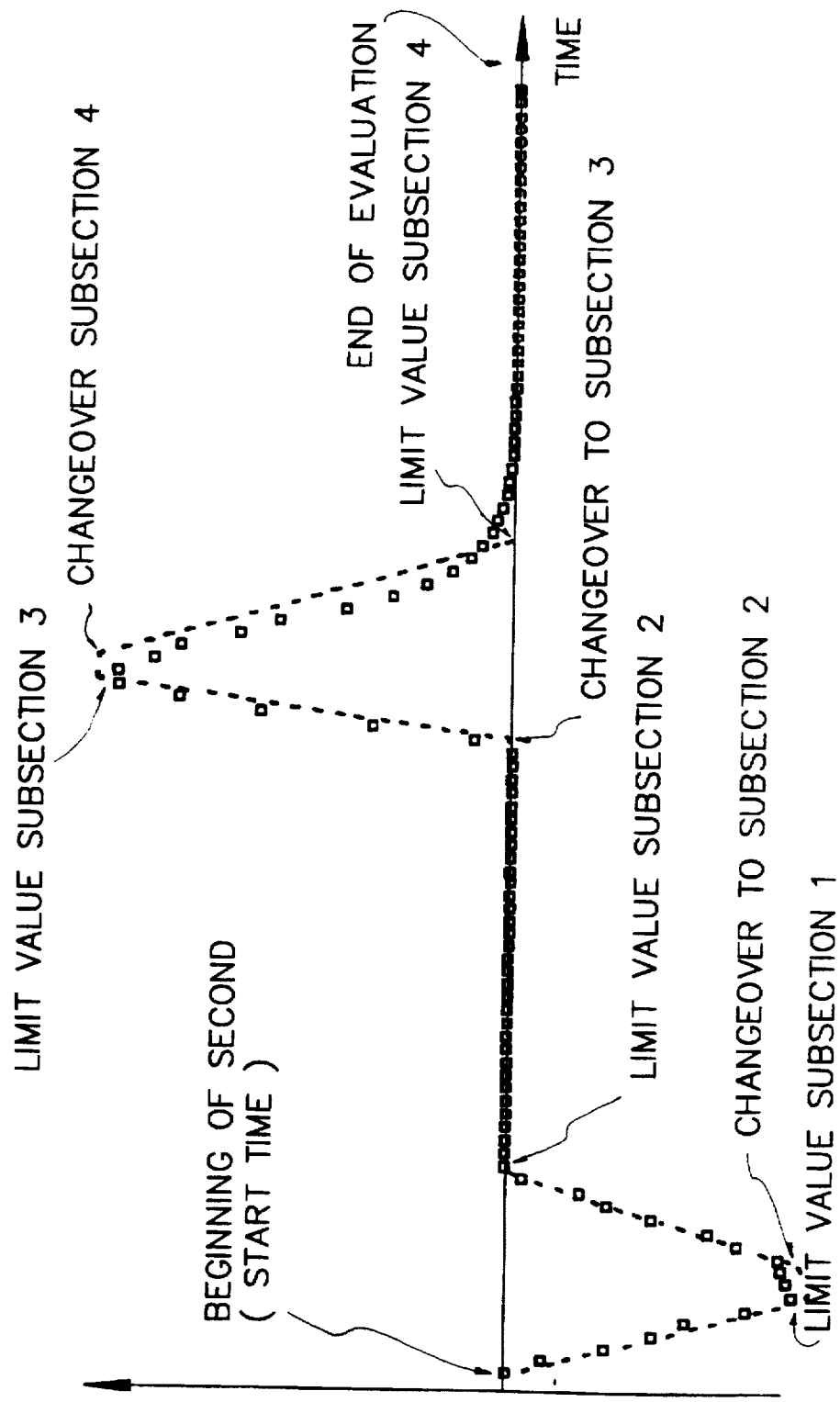
FIG. 1 shows a reference signal compared with a received signal section.

The present invention will now be explained by describing the method as applied to the time-signal transmission of the transmitters DCF-77 and WWVB as an example. The method is not, however, limited to this application and these two transmitter stations. For the transmission of time signals, signals are transmitted from both transmitters at one second intervals in the longwave range, the seconds pulses being used to transmit information units in order to transmit the complete time information. The information units are encoded by a differently long blanking of the carrier wave. For reception, a tuned radio-frequency receiver is used, for example, as described in DE 35 16 810 C2. Typical transients then result for each of the received information units. The received waveform or signal curve in FIG. 1 (full line with dots) is a transient of this kind. To decode the transmitted information, the output signal of the receiver circuit is divided into sections that each contain one information unit. Each section is compared with the reference functions in order to decode the information unit.

For each possible kind of information unit , that is, for each different information unit in the set of information units available for transmission, there is one reference function. In the case of the time-signal transmitter DCF-77, logical zeros and logical ones are transmitted. There are therefore two types of information unit and hence also two reference functions. In the case of the transmitter WWVB, frame pulses are transmitted in addition to logical zeros and ones. Here, there are three kinds of information unit. Consequently, three reference functions must be used for decoding. The reference functions are formed by conjoined straight-line segments or pieces which optimally approximate the curve of an ideal undisturbed signal section. In order to generate the reference functions, the signal sections are divided up into subsections, each of which can be roughly approximated by a straight line. Each straight-line piece is characterized by a start value, an end value, and a slope (FIG. 2). The straight-line pieces placed together in the various subsections result in the reference function: dashed line in FIG. 1.

Since the shape of the signal curve varies considerably according to disturbances, the reference functions must be adapted appropriately in order to be able to reliably decode even a highly disturbed signal section. The reference functions are left in their basic shape but their specific features, such as the slopes of the straight lines in the subsections, are adapted to the signal shape modified by disturbances.

The paths followed by the straight lines in the subsections 'can either be predetermined or they can be variable in accordance with the signal curve in one of the preceding subsections or in the actual subsection.

FIG. 2 shows a straight line in a subsection with the necessary key data for matching: Start value, slope, limit value, and period. The start value is either specified beforehand (e.g. by the function value at the end of the preceding subsection) or the actual signal value is taken. The slope and limit value and period are either predetermined or variable in accordance with the signal curve in preceding subsections. If the function value reaches the limit value before the end of the period, it remains constant for the remaining time until the end of the subsection.

Figure 2:
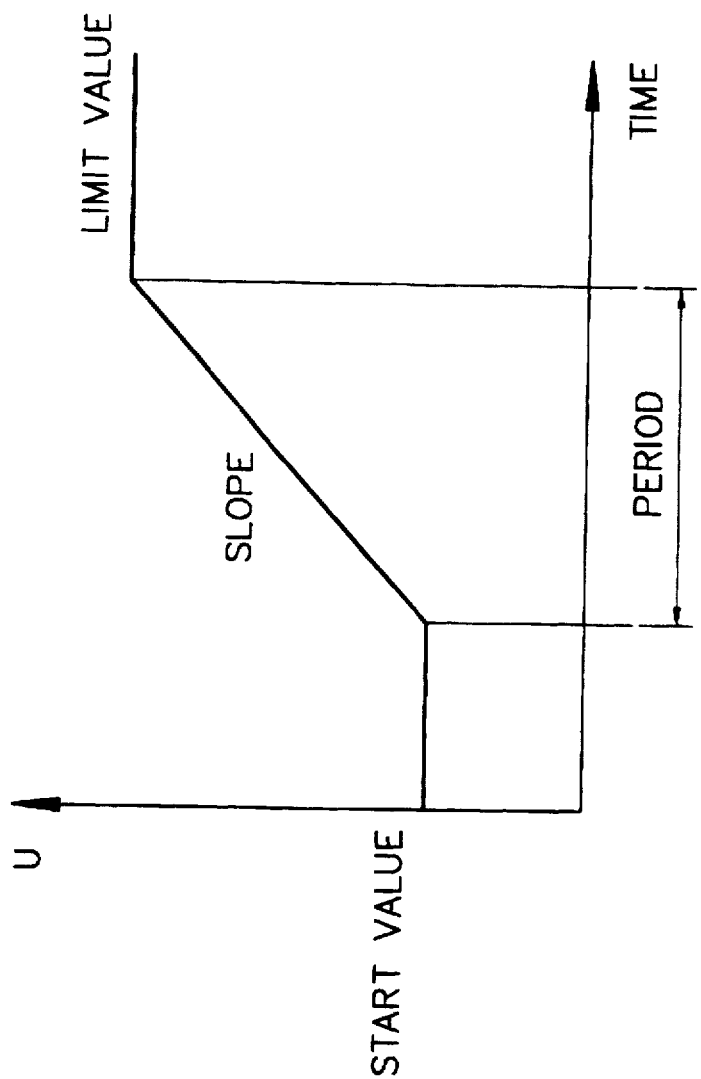
FIG. 2 shows the basic shape of a straight line for forming the reference function in a subsection.

FIG. 1 shows the comparison of an actual signal with a reference signal. In FIG. 3, the parameters of the transitions of the subsections are given in tabular form and explained as follows.

The first subsection begins with the beginning of the seconds blanking. The reference signal has the predetermined start value (equal to zero), a fixed (negative) slope, a fixed limit value and a fixed period.

The second subsection begins with the end of the first subsection. The start value of the reference signal is predetermined by the signal value at the end of the first subsection. The straight line has a variable slope, a fixed limit value and a fixed period. The period of the second subsection is one of the main criteria in which the various reference functions differ.

The third subsection begins at the end of the second subsection. The start value of the straight line of the reference function is predetermined by the function value at the end of the second subsection. The straight line has a variable positive slope, a variable limit value and a fixed period. The slope and the limit value are determined by the signal curve in the first subsection.

The fourth subsection begins at the end of the third subsection. The start value of the straight line of the reference function is predetermined by the function value at the end of the third subsection. The straight line has a variable negative slope, a fixed limit value and a fixed period. The slope is determined by the signal curve in the first subsection.

At the end of the fourth subsection, the analysis proper regarding the transmitted information unit in the actual signal section is concluded. Until the first subsection of the next signal section begins, there is an intermediate zone in which the signal is constant.

Figure 4:
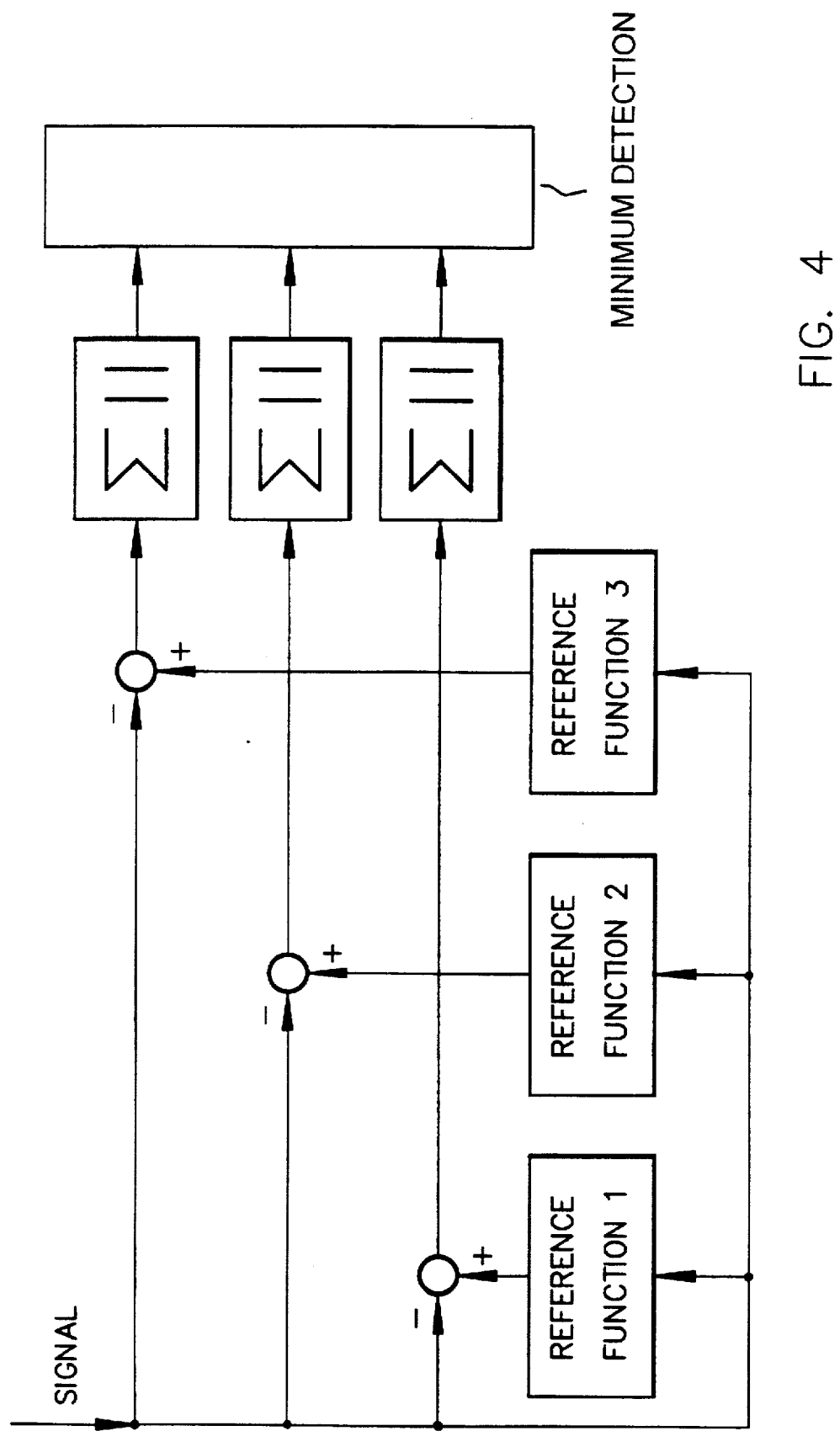
FIG. 4 shows a function diagram for the method.

In order to reconstruct or decode disturbed time signals, the received signal sections are compared with reference functions. The comparison can be performed by simply subtracting the reference functions from the signal in the signal section and then forming the total first of all for each point and every reference function. The decision as to which information unit is presently being transmitted or received can be made as a result of the total error that has been determined for each reference function in the course of the signal section. The individual errors are added for this purpose over the duration of a signal section. The information unit for which the reference function produces the smallest error is considered to have been identified. FIG. 4 shows such a function diagram. In accordance with the method adopted by the invention, the received signal also exerts an influence on the shape of the reference functions.

One possibility for determining the actual key data of the straight-line pieces of the reference function in the various subsections is to use FUZZY methods of computation. By defining membership ranges and by the interpolative effect of processing units between the membership ranges, non-linear relationships can be described effectively.

The variable parameters (key values for the straight-line pieces) are described by a mean value, a minimum value and a maximum value. The fuzzy controller now has the task of determining from these three values the correct value of the relevant parameter for each straight line and for each reference function, controlled by the signal in the actual signal section.

The start value prevailing in the second subsection has been found to be particularly advantageous as controlled variable on receiving time signals. This variable is available here as input variable for the fuzzy controller, for example.

Figure 5:
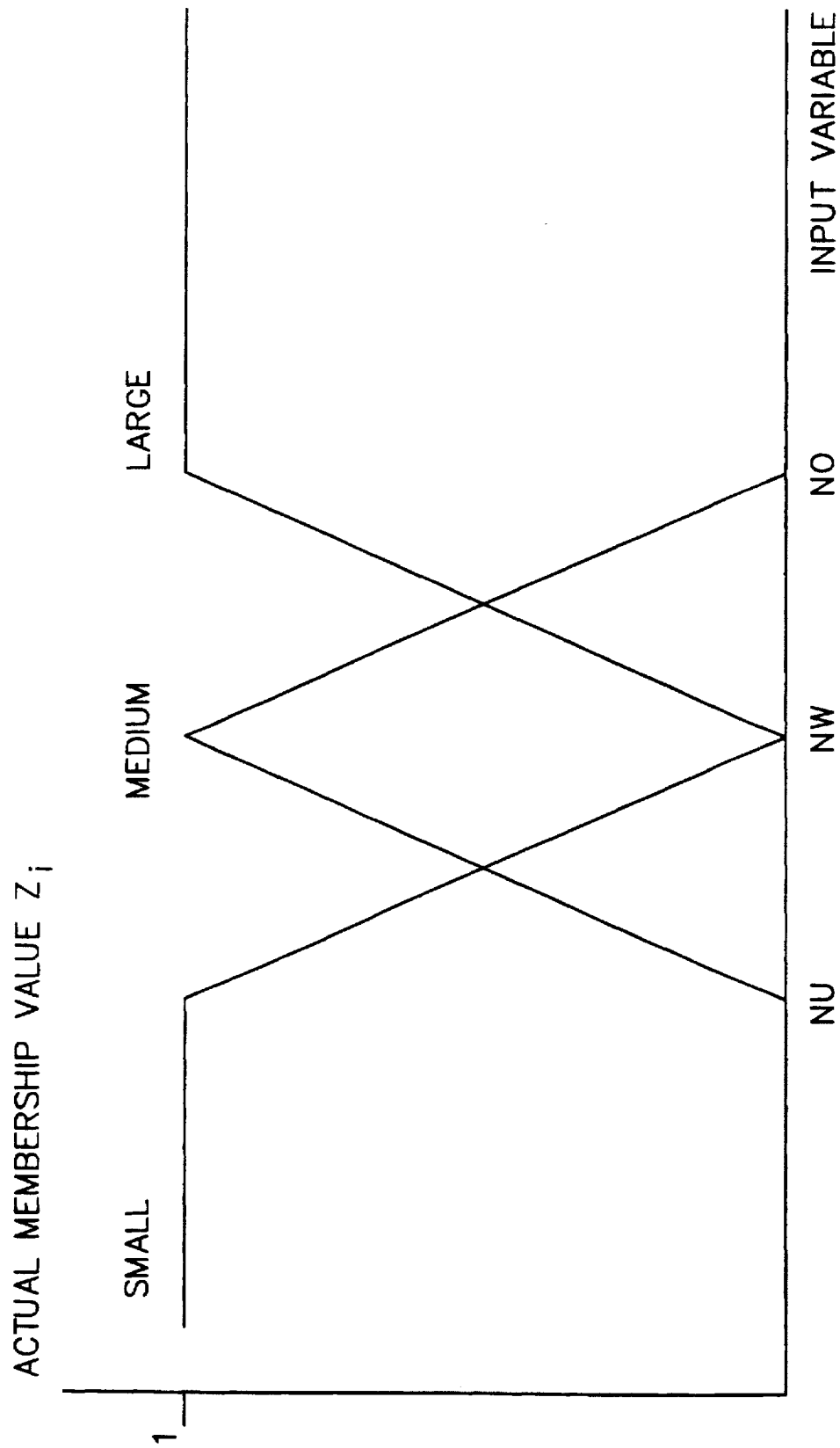
FIG. 5 shows membership functions for the fuzzyfication.

The fuzzyfication determines the membership value of the input variable to the various input classes. The classification of the actual membership value of the input variable in the input classes is shown in FIG. 5. As a result of fuzzyfication, each input variable is assigned an actual membership value for each input class. In the present example, an actual membership value z1, z2, z3 is included in the start value for each of the start values "small", "medium" and "large".

$$Z_1 = \begin{cases} 1 & : u < NU \\ \frac{-1}{NW-NU}(u-NW) & : NU \leq u < NW \\ 0 & : NW \leq u < NO \\ 0 & : u \geq NO \end{cases}$$

$$Z_2 = \begin{cases} 0 & : u < NU \\ \frac{1}{NW-NU}(u-NU) & : NU \leq u < NW \\ \frac{-1}{NO-NW}(u-NO) & : NW \leq u < NO \\ 0 & : u \geq NO \end{cases}$$

$$Z_3 = \begin{cases} 0 & : u < NU \\ 0 & : NU \leq u < NW \\ \frac{1}{NO-NW}(u-NW) & : NW \leq u < NO \\ 0 & : u \geq NO \end{cases}$$

The variables NU, NW and NO identify the transitions in the membership functions shown in FIG. 5. They are determinant for calculation of the slopes to be matched and/or limit values of the reference functions. They must be established once for the system.

By means of the rule base, the individual pieces of the fuzzy information, i.e. the applicable input class membership of the input variable, are interrelated with each other according to the rules that are derived from the knowledge on the process. This procedure is called inference. The following rules describes the selection of actual output value:

IF input variable large, THEN output variable minimum value

IF input variable medium, THEN output variable mean value

IF input variable small, THEN output variable maximum value

At defuzzification, a precise output value results from the fuzzy inference result. In a preferred example of embodiment, a modified center-of-gravity method is used. The structure of the rules allows a simplified calculation of an actual output value. The use of only one variable in the IF clause of the rules allows the used of the following procedure:

multiplication of the output value (minimum, mean, maximum) of a rule by the satification value of a rule $(Z_1 \ldots Z_3)$ summation of the result values of the multiplication summation of the satification values of all rules
calculation of the output value V $$V = \frac{\text{sum of multiplication}}{\text{sum of satification values}}$$

The actual membership values of all rules are multiplied by the value of the satisfied rule and then added. They are then divided by the total of the values of the satisfied rules.

The method presented has been tested both in the laboratory and in field trials. With defined disturbance signals for a sine-sweep distortion that was 600 Hz away from the DCF-77 mid-band frequency, improvements resulted in the laboratory of 20 dB and for a Gaussian distortion signal (white noise) of 8 dB. In free field trials, an average improvement of 10 dB was found.

What is claimed is:

1. A method for decoding transmitted information units comprising comparing a received signal curve in a signal section containing an information unit with a number of reference functions, where a reference function is assigned to every information unit in a set of information units available for transmission, and recognizing the information unit on the basis of which reference function of the set has the smallest deviation from the signal curve, wherein the reference functions are modified in accordance with the signal curve in the respective signal section.

2. A method in accordance with claim 1, wherein the signal section and the reference functions are divided into equivalent subsections, and the signal curve in a subsection of the signal section causes modifications in one or several subsections of the reference functions.

3. A method in accordance with claim 2, wherein the reference functions are modified by fuzzy control in accordance with one or several signal values in the respective signal section.

4. A method in accordance with claim 3, wherein the reference functions in the various subsections comprise straight line segments.

5. A method in accordance with claim 4, wherein the slopes of the straight line segments are adapted in various subsections in accordance with signal disturbances.

6. A method in accordance with claim 5, wherein the straight line segments of the various subsections have upper and lower limiting values and wherein these limiting values are modified in accordance with the signal curve.

7. A method of decoding an information unit that has been transmitted by radio, the transmitted information unit being selected from a set of information units which are assigned respective reference functions, said method comprising the steps of:

(a) receiving a signal which carries the transmitted information unit in a signal section, the received signal having a signal curve in the signal section;

(b) modifying the assigned reference functions in accordance with the signal curve to provide modified reference functions;

(c) comparing the signal curve to the modified reference functions to determine a deviation value between the signal curve and each of the modified reference functions; and (d) using the deviation values to recognize the transmitted information unit.

8. The method of claim 7, wherein step (b) comprises dividing the signal section and assigned reference functions into equivalent subsections, and modifying the assigned reference functions in at least one of the subsections in accordance with the signal curve in at least one of the subsections.

9. The method of claim 8, wherein each of the assigned reference functions is composed of a plurality of straight line segments, each subsection of a given one of the assigned reference functions containing at least one of the line segments of which the given one of the reference functions is composed.

10. The method of claim 9, wherein step (b) further comprises using fuzzy control to modify the line segments of the assigned reference functions in at least one of the subsections.

11. The method of claim 7, wherein step (b) comprises using fuzzy control.

* * * * *